United States Patent [19]

Sybert

[11] Patent Number: 4,845,160

[45] Date of Patent: Jul. 4, 1989

[54] POLYPHENYLENE ETHER-POLYESTER COPOLYMERS AND METHOD FOR THEIR PREPARATION

[75] Inventor: Paul D. Sybert, Pittsfield, Mass.

[73] Assignee: General Electric Company, Schenectady, N.Y.

[21] Appl. No.: 152,509

[22] Filed: Feb. 5, 1988

Related U.S. Application Data

[63] Continuation-in-part of Ser. No. 885,111, Jul. 14, 1986, abandoned.

[51] Int. Cl.⁴ ............................................. C08F 283/08
[52] U.S. Cl. ..................................... 525/391; 525/397
[58] Field of Search .......................................... 525/391

[56] References Cited

U.S. PATENT DOCUMENTS 3,549,571 12/1970 Berg et al. ............................. 525/397
3,637,578 1/1972 Wright et al. ........................... 525/27
4,614,773 12/1986 Sugio et al. ........................... 525/397
4,623,558 11/1986 Lin ....................................... 525/391
4,654,405 3/1987 Jalbert et al. ......................... 525/397

FOREIGN PATENT DOCUMENTS 937696 12/1973 Canada ................................. 525/394

Primary Examiner—John Kight
Assistant Examiner—Frederick Krass
Attorney, Agent, or Firm—William H. Pittman; James C. Davis, Jr.

[57] ABSTRACT

Polyphenylene ether-polyester copolymers, useful for compatibilizing blends of polyphenylene ethers with polyesters such as poly(alkylene terephthalates), are prepared by heating a polyphenylene ether with a polyester containing olefinic structural units, such as those derived from maleic or fumaric acid.

14 Claims, No Drawings

POLYPHENYLENE ETHER-POLYESTER COPOLYMERS AND METHOD FOR THEIR PREPARATION

This application is a continuation-in-part of copending application Ser. No. 885,111, filed July 14, 1986, now abandoned.

This invention relates to novel copolymers useful in the preparation of resinous compositions with high impact resistance and solvent resistance.

The polyphenylene ethers are a widely used class of thermoplastic engineering resins characterized by excellent hydrolytic stability, dimensional stability and dielectric properties. They are also resistant to high temperature conditions under many circumstances. Because of the brittleness of many compositions containing polyphenylene ethers, they are frequently blended with impact modifiers such as elastomers to form molding compositions.

A disadvantage of the polyphenylene ethers which militates against their use for molding such items as automotive parts is their low resistance to non-polar solvents such as gasoline. For increased solvent resistance, it would be desirable to blend the polyphenylene ethers with resins which have a high degree of crystallinity and therefore are highly resistant to solvents. Illustrative of such resins are the poly(alkylene dicarboxylates), especially the poly(alkylene terephthalates). However, such blends frequently undergo phase separation and delamination. They typically contain large, incompletely dispersed polyphenylene ether particles and no phase interaction between the two resin phases. Molded parts made from such blends are typically characterized by extremely low impact strength.

In copending, commonly owned application Ser. No. 866,661, now abandoned, there are disclosed a large number of polyphenylene ether-polyester copolymers useful for the compatibilization of blends of polyphenylene ethers and polyesters. These copolymers are, for the most part, prepared by the reaction of functionalized polyphenylene ethers with polyesters or by the reaction of amine- or isocyanate-functionalized polyesters with polyphenylene ethers. Interest continues in the development of copolymers of this type which may be used for the compatibilization of such blends.

A principal object of the present invention, therefore, is to provide copolymer compositions suitable for the compatibilization of polyphenylene ether-polyester blends.

A further object is to provide a method for the preparation of such copolymers.

Other objects will in part be obvious and will in part appear hereinafter.

In one of its aspects, the present invention is directed to polyphenylene ether-polyester copolymers and a method for their preparation, which method comprises reacting, at a temperature in the range of about 180°–350° C., at least one polyphenylene ether with at least one polyester containing olefinic structural units and free from acyl halide groups.

The polyphenylene ethers (also known as polyphenylene oxides) used in the method of this invention are a well known class of polymers. They are widely used in industry, especially as engineering plastics in applications requiring toughness and heat resistance. Since their discovery, they have given rise to numerous variations and modifications all of which are applicable to the present invention, including but not limited to those described hereinafter.

The polyphenylene ethers comprise a plurality of structural units having the formula

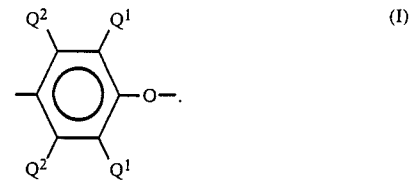

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–60,000, as determined by gel permeation chromatography. Its intrinsic viscosity is most often in the range of about 0.35–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds and ω-hydroxyoximes.

Among the polyphenylene ethers which are useful for the purposes of this invention are those which comprise molecules having at least one of the end groups of the formulas

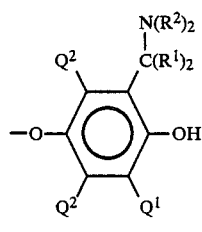

and

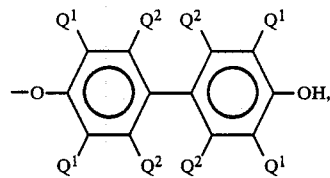

wherein $Q^1$ and $Q^2$ are as previously defined; each $R^1$ is independently hydrogen or alkyl, with the proviso that the total number of carbon atoms in both $R^1$ radicals is 6 or less; and each $R^2$ is independently hydrogen or a $C_{1-6}$ primary alkyl radical. Preferably, each $R^1$ is hydrogen and each $R^2$ is alkyl, especially methyl or n-butyl.

Polymers containing the aminoalkyl-substituted end groups of formula II may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain. During further processing and/or blending, the aminoalkyl-substituted end groups may undergo various reactions, probably involving a quinone methide-type intermediate of the formula

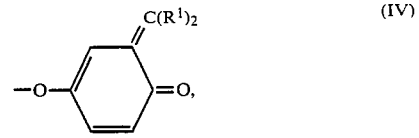

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula III are typically obtained from reaction mixtures in which a by-product diphenoquinone of the formula

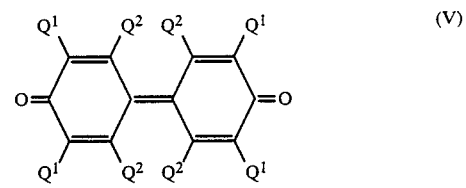

is present, especially in a copper-halide-secondary or tertiary amine system. In this regard, the disclosures of U.S. Pat. No. 4,477,649 is again pertinent as are those of U.S. Pat. Nos. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas II and III. It should be understood, however, that other end groups may be present and that the invention in its broadest sense may not be dependent on the molecular structures of the polyphenylene ether end groups.

It will be apparent to those skilled in the art from the foregoing that the polyphenylene ethers contemplated for use in the present invention include all those presently known, irrespective of variations in structural units or ancillary chemical features.

As previously indicated, the polyesters useful in the method of this invention have olefinic structural units. These are capable of undergoing reaction with the polyphenylene ether under the conditions of the invention.

The preferred polyesters contain structural units of the formula

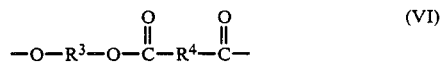

and of at least one of the formulas

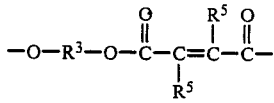

(VII)

and

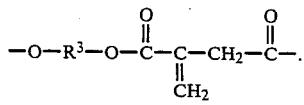

(VIII)

In these formulas, each of $R^3$ and $R^4$ is a divalent aliphatic, alicyclic or aromatic radical containing about 2–10 carbon atoms and each $R^5$ is independently hydrogen or a $C_{1-4}$ primary or secondary alkyl radical, at least one $R^5$ being hydrogen.

Illustrative $R^3$ and $R^4$ radicals are ethylene, propylene, trimethylene, tetramethylene, hexamethylene, decamethylene, 1,4-cyclohexane-bis-methylene, olefinic derivatives of the foregoing, p-phenylene, m-phenylene and bis(4-phenylene)propane. Also included are substituted radicals wherein the substituents do not substantially affect the relevant chemical properties of the radical; illustrative substituents are alkoxy, halo and nitrile. Most often, $R^3$ is an alkylene radical, preferably ethylene or tetramethylene, and $R^4$ is m- or p-phenylene.

In formula VII, each $R^5$ may be hydrogen or a primary or secondary $C_{1-4}$ alkyl radical such as methyl, ethyl, 1-propyl, 2-propyl, 1-butyl or 2-butyl. At least one $R^5$ value is hydrogen. Among the alkyl radicals, methyl is preferred.

Thus, the radicals of formulas VII and VIII are derived from unsaturated dicarboxylic acids such as maleic, fumaric, citraconic or itaconic acid. Maleic and fumaric acids are preferred by reason of their availability and low cost.

It is also contemplated to employ elastomeric polyesters. Such polyesters are known in the art; they are exemplified by compositions in which a portion of the $R^3$ values are soft segment radicals such as polyoxyalkylene (typically polyoxyethylene or polyoxytetramethylene) and units derived from lactones such as ε-caprolactone. Numerous elastomeric polyesters of this type are commercially available; they include those sold by DuPont under the trademark HYTREL and by General Electric under the trademark LOMOD.

Such polyesters may be prepared by the known reaction of dihydroxy compounds with mixtures of dicarboxylic acids or of functional derivatives thereof such as anhydrides, acid chlorides or lower alkyl (especially methyl) esters. The esters are often the preferred reactants.

Polyester preparation is achieved under conventional conditions known in the art. Thus, a diol may be reacted with a mixture of dicarboxylic acid derivatives such as esters. Alternatively, a polyester oligomer may be prepared from the diol and one of the acid derivatives (typically corresponding to formula VI) and an ester of the other acid derivative (typically corresponding to formula VII and/or VIII) added at a later stage in the reaction. The latter ester is preferably a hydroxyalkyl ester of the same diol used in the earlier reaction. Said esterification reactions are typically conducted in the presence of conventional catalysts such as tetraalkyl titanates.

The proportion of units of formula VII and/or VIII in the polyester is not critical and may be adjusted to provide the desired properties, chiefly the amount of copolymer formation with the polyphenylene ether. Most often, about 5–20% of the total number of polyester structural units have formula VII and/or VIII, with the balance having formula VI.

U.S. Pat. No. 3,703,564 and Canadian Pat. No. 937,696 disclose the formation of block copolymers of polyesters and polyphenylene ethers (referred to therein as "polyphenylene oxides"). They are formed by the reaction of the polyphenylene ether with an acyl halide-terminated polyester which may contain unsaturated moieties. In the present invention, on the other hand, the employment of polyesters containing acyl halide groups is neither necessary nor contemplated, since the unsaturated moieties alone are capable of reaction with the polyphenylene ether to afford a product suitable for the purposes described.

The preparation of suitable polyesters is illustrated by the following examples.

EXAMPLE 1

A mixture of 353.7 grams (1.82 moles) of dimethyl terephthalate, 14.61 grams (101 mmol.) of dimethyl maleate, 280 grams (2 moles) of 1,4-butanediol, 2.6 grams of a hindered phenol stabilizer and 0.44 ml. of tetra(2-ethylhexyl) titanate was heated at 175°–225° C. as methanol was removed by distillation. The mixture was then heated at 240°–250° C. at a pressure of about 0.1 torr for about 1 hour. The product was the desired polyester.

EXAMPLE 2

A mixture of 2S2 grams (1.96 moles) of dimethyl maleate, 320 grams (3.55 moles) of 1,4-butanediol and a catalytic amount of tetraisopropyl titanate was heated at 165° C. as methanol was removed by distillation. The product was bis(4-hydroxybutyl) maleate.

A mixture of 360 grams (1.85 moles) of dimethyl terephthalate, 290 grams (3.22 moles) of 1,4-butanediol, 2.47 grams of a hindered phenol stabilizer and 0.44 ml. of tetra(2-ethylhexyl) titanate was heated at 180°–230° C. with stirring, as methanol was removed by distillation. When methanol evolution was complete, the temperature was increased to 245° C. and reduced pressure was applied for 55 minutes. There was then added, under nitrogen, 50 grams (0.19 mole) of bis(4-hydroxybutyl) maleate. Stirring was continued for about 5 minutes, after which reduced pressure was applied and stirring was continued for an additional ½ hour. The product was the desired polyester.

The compositions of this invention may be conveniently prepared by heating the polyphenylene ether-polyester mixture, in solution or in the melt, at a temperature within the range of about 180°–350° C. The reaction conditions often include extrusion, which may be conveniently effected in a screw-type or similar extruder which supplies a substantial shearing force to the composition. The weight ratio of polyester to polyphenylene ether is generally in the range of about 0.5–3.0:1, most often about 0.9–2.5:1.

The precise nature of the reaction which takes place upon practice of the method of this invention is not known with certainty. The principal reaction is most likely a thermally initiated free radical interaction of the olefinic bonds in the polyester with the aromatic rings of the polyphenylene ether or the substituents thereon, especially the latter, to produce a product which may include moieties derived from the polyester. However, the invention is in no way dependent on theory.

In general, the compositions of this invention comprise only partially copolymer, with the balance being a polyphenylene ether-polyester blend. The approximate proportion of copolymer in the composition may often be conveniently expressed as the percentage of copolymerized polyphenylene ether based on total polyester. It may be determined by extracting unreacted polyphenylene ether with a suitable solvent, typically toluene, and analyzing the insoluble residue (copolymer and residual polyester) by proton nuclear magnetic resonance.

The compositions of this invention may also contain ingredients other than the copolymer, polyphenylene ether and polyester. A particularly useful other ingredient in many instances is at least one elastomeric impact modifier which is compatible with the polyphenylene ether or polyester. It is generally present in the amount of about 5–25% by weight of resinous components.

Suitable impact modifiers include various elastomeric copolymers, of which examples are ethylene-propylenediene polymers (EPDM's,), both unfunctionalized and functionalized with (for example) sulfonate or phosphonate groups; carboxylated ethylene-propylene rubbers; copolymers (usually block or graft) of alkenylaromatic compounds such as styrene and/or epoxy compounds such as glycidyl methacrylate with polymerizable olefins or dienes, including butadiene, isoprene, chloroprene, ethylene, propylene and butylene; and core-shell elastomers containing, for example, a poly(alkyl acrylate) core attached to a polystyrene shell via an interpenetrating network. Such core-shell elastomers are more fully disclosed in copending, commonly owned application Ser. No. 811,800, filed Dec. 20, 1985.

The preferred impact modifiers are block (typically diblock, triblock or radial teleblock) copolymers of alkenylaromatic compounds and olefins or dienes. Most often, at least one block is derived from styrene and at least one other block from at least one of butadiene, isoprene, ethylene and butylene. Especially preferred are the triblock copolymers with polystyrene end blocks and olefin- or diene-derived midblocks. When one of the blocks is derived from one or more dienes, it is frequently advantageous to reduce the aliphatic unsaturation therein by selective hydrogenation. The weight average molecular weights of the impact modifiers are typically in the range of about 50,000–300,000. Block copolymers of this type are commercially available from Shell Chemical Company under the trademark KRATON, and include KRATON D1101, G1650, G1651, G1652, G1657 and G1702.

Other conventional ingredients which may be present include fillers, flame retardants, colorants, stabilizers, antistatic agents, mold release agents and the like, used in conventional amounts. The presence of other resinous components is also contemplated. These include impact modifiers compatible with the polyester, such as various graft and core-shell copolymers of such monomers as butadiene, styrene, butyl acrylate and methyl methacrylate. The presence of such copolymers frequently improves the low-temperature ductility of the blends.

The invention is illustrated by the following examples. The polyphenylene ether used in each example was a poly-(2,6-dimethyl-1,4-phenylene ether) having a number average molecular weight of about 20,000, an intrinsic viscosity (IV) in chloroform at 25° C. of 0.48 dl./g. and 0.084% (by weight) hydroxy groups.

EXAMPLE 3–5

Solutions of 1.36 grams of each of polyphenylene ether and polyester and about 0.83 gram of a hindered phenol stabilizer in 27 ml. of 1,2,4-dichlorobenzene were stirred at 200° C. under nitrogen for 6 hours. Toluene, 100 ml., was then added to the hot solution and the mixture was heated under reflux for ½ hour. The copolymer-containing products were removed by centrifugation, washed with toluene, centrifuged again and dried under reduced pressure. They were analyzed as described hereinabove for percentage of copolymerized polyphenylene ether.

EXAMPLES 6–7

Blends of 45 parts polyphenylene ether, 45 parts polyester, 10 parts of an impact modifier and about 0.28 part of a hindered phenol stabilizer were prepared by dry blending on a jar mill followed by extrusion in a twin screw extruder at 260° C. and 80 rpm. The extrudates were quenched in water, pelletized and analyzed for percent copolymerized polyphenylene ether. The impact modifier was a commercially available triblock copolymer in which the polystyrene end blocks have weight average molecular weights of 29,000 and the ethylene/butylene midblock has a weight average molecular weight of 116,000.

The relevant parameters for Examples 3–7 are given in the following table.

|  | Example | | | | |
| --- | --- | --- | --- | --- | --- |
|  | 3 | 4 | 5 | 6 | 7 |
| Polyester: | | | | | |
| Method of preparation | Ex. 1 | Ex. 2 | Ex. 2 | Ex. 1 | Ex. 1 |
| Maleate units, mole percent | 5.3 | 9.4 | 4.9 | 5.3 | 5.2 |
| Copolymerized polyphenylene ether, % | 10 | 16 | 14 | 7 | 5 |

As previously mentioned, the compositions of this invention, and polyphenylene ether-poly(alkylene dicarboxylate) blends in which they are incorporated, have high impact strength, good solvent resistance and other advantageous properties. These properties make them useful for the preparation of molded and extruded articles.

The weight ratio of polyester to polyphenylene ether in the blend, as in the copolymer composition, is generally in the range of about 0.5–3.0:1, most often about 0.9–2.5:1. The proportion of copolymerized polyphenylene ether therein is capable of wide variation, essentially any quantity thereof affording some improvement in properties. For the most part, said proportion is in the range of about 5–80% by weight of total resinous components.

What is claimed is:

1. A method for preparing a thermoplastic polyphenylene ether-polyester copolymer which comprises effecting reaction, at a temperature in the range of about 180°–350° C., between the constituents of a mixture consisting essentially of at least one polyphenylene ether and at least one polyester which is free from acyl halide groups, said polyester consisting essentially of structural units of the formula

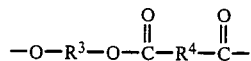
(VI)

and of at least one of the formulas

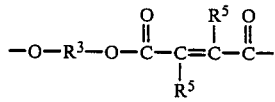
(VII)

and

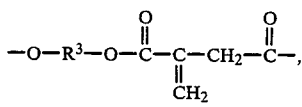
(VIII)

wherein $R^3$ is an alkylene radical, $R^4$ is m- or p-phenylene and each $R^5$ *is independently hydrogen or a* $C_{1-4}$ primary or secondary alkyl radical, at least one $R^5$ being hydrogen; about 5–20% of the total number of polyester structural units having one or both of formulas VII and VIII.

2. A method according to claim 1 wherein the polyphenylene ether comprises a plurality of structural units having the formula

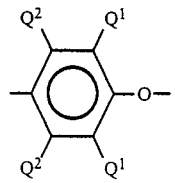
(I)

and in each of said units independently, each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for Q1.

3. A method according to claim 2 wherein the polyphenylene ether is a poly(2,6-dimethyl-1,4-phenylene ether).

4. A method according to claim 1 wherein $R^3$ is ethylene or tetramethylene.

5. A method according to claim 4 wherein the polyester contains structural units of formulas VI and VII.

6. A method according to claim 5 wherein each $R^5$ is hydrogen.

7. A method according to claim 6 wherein $R^3$ is tetramethylene and $R^4$ is p-phenylene.

8. A composition prepared by the method of claim 1.
9. A composition prepared by the method of claim 2.
10. A composition prepared by the method of claim 3.
11. A composition prepared by the method of claim 4.
12. A composition prepared by the method of claim 5.
13. A composition prepared by the method of claim 6.
14. A composition prepared by the method of claim 7.

* * * * *